US012290175B2

(12) United States Patent
Johnson

(10) Patent No.: US 12,290,175 B2
(45) Date of Patent: May 6, 2025

(54) REFERENCE IMAGE HOLDER

(71) Applicant: Thelma Kawana Johnson, Riverdale, GA (US)

(72) Inventor: Thelma Kawana Johnson, Riverdale, GA (US)

( * ) Notice: Subject to any disclaimer, the term of this patent is extended or adjusted under 35 U.S.C. 154(b) by 15 days.

(21) Appl. No.: 17/718,305

(22) Filed: Apr. 11, 2022

(65) Prior Publication Data

US 2022/0232977 A1  Jul. 28, 2022

Related U.S. Application Data

(63) Continuation-in-part of application No. 16/864,168, filed on May 1, 2020, now abandoned.

(60) Provisional application No. 62/920,469, filed on May 2, 2019.

(51) Int. Cl.
| | |
|---|---|
| *A47B 97/04* | (2006.01) |
| *F16M 11/28* | (2006.01) |
| *F16M 11/40* | (2006.01) |
| *F21V 23/04* | (2006.01) |
| *F21V 33/00* | (2006.01) |
| *F21Y 115/10* | (2016.01) |

(52) U.S. Cl.
CPC .............. *A47B 97/04* (2013.01); *F16M 11/28* (2013.01); *F16M 11/40* (2013.01); *F21V 23/04* (2013.01); *F21V 33/008* (2013.01); *F21Y 2115/10* (2016.08)

(58) Field of Classification Search
CPC ........ A47B 97/04; F16M 11/28; F16M 11/40; F21V 23/04; F21V 33/008; F21Y 2115/10
See application file for complete search history.

(56) References Cited

U.S. PATENT DOCUMENTS

| | | | | |
|---|---|---|---|---|
| 1,602,338 A | * | 10/1926 | Chittenden | A47B 19/06 248/448 |
| 4,596,372 A | * | 6/1986 | Ford | A47B 23/04 248/446 |
| 5,671,900 A | * | 9/1997 | Cutler | B25H 1/00 248/448 |
| 6,086,228 A | * | 7/2000 | McGowan | F21V 21/088 362/396 |
| 7,040,591 B1 | * | 5/2006 | Simon | A47B 23/04 248/458 |
| 2003/0160144 A1 | * | 8/2003 | Guadagnini | A47B 19/00 248/447 |
| 2006/0077286 A1 | * | 4/2006 | Wenderski | G03B 17/561 348/E5.025 |

(Continued)

FOREIGN PATENT DOCUMENTS

| | | | | |
|---|---|---|---|---|
| CN | 206729539 U | * | 12/2017 | |
| JP | 2006012755 A | * | 1/2006 | .............. F21S 6/003 |

*Primary Examiner* — Tan Le
(74) *Attorney, Agent, or Firm* — Hoang Steve Ngo

(57) ABSTRACT

The present invention is a reference image holder device for assisting a user during the making of a painting or other artwork by allowing the user to have their hands free of needing to hold a reference image or other objects. As a non-limiting example, the reference image holder may include some or all of the following components: a base, a pole, a gooseneck section, at least one height adjuster collet, a handle, magnet strips, an interchangeable reference bar, music control(s), an LED and power button, and USB port or connector.

20 Claims, 8 Drawing Sheets

(56) References Cited

U.S. PATENT DOCUMENTS

| | | | | |
|---|---|---|---|---|
| 2007/0034753 A1* | 2/2007 | Lee | ............... | B60R 11/0241 |
| | | | | 248/121 |
| 2008/0158411 A1* | 7/2008 | Firnberg | ............ | F16M 13/022 |
| | | | | 348/373 |
| 2009/0207589 A1* | 8/2009 | Smith | ............... | A47B 23/06 |
| | | | | 248/452 |
| 2012/0091307 A1* | 4/2012 | Haynes | ............ | A47B 23/043 |
| | | | | 248/451 |

\* cited by examiner

REFERENCE IMAGE HOLDER

CROSS-REFERENCE TO RELATED APPLICATIONS

The present application claims the priority benefit of U.S. Nonprovisional patent application Ser. No. 16/864,168, filed on May 1, 2020, which claims the priority benefit of U.S. Provisional Patent Application Ser. No. 62/920,469, filed on May 2, 2019, which are both incorporated herein by reference in their entireties.

TECHNICAL FIELD

This disclosure relates to implementations of a reference image holder.

BACKGROUND

Artists often use reference images to help them make paintings or other artwork. A reference image can help an artist gain useful information, such as spatial relationships, colors, and forms, that can inform or inspire the artist for making a painting or other artwork. For example, a reference image may be a photograph, a drawing, or another painting that an artist can view and study.

To use a reference image while making a painting or other artwork, artists usually have to hold the reference image by hand, such as shown in FIG. 1A, or prop the reference image against an object, such as shown in FIG. 1B. However, there does not exist a convenient tool that allows an artist to use a reference image while making a painting or other artwork, such as to hold and move around the reference image for viewing and studying by the artist.

It should be understood that the above-attached figures are not intended to limit the scope of the present invention in any way.

DETAILED DESCRIPTION OF THE PREFERRED EMBODIMENTS

Implementations of a reference image holder are provided. In some implementations, the reference image holder comprises a base, a pole, a first arm, and a second arm. In some implementations, the reference image holder may further comprise a light source. In some implementations, the reference image holder may further comprise one or more speakers.

In some implementations, the reference image holder is configured to allow an artist to conveniently hold a reference image hands-free to use the reference image while making a painting or other artwork.

In some implementations, the reference image holder is configured to allow the artist to conveniently move around the reference image, such as to various viewing positions, locations, orientations, etc., while making a painting or other artwork.

In some implementations, the reference image holder is configured to hold a reference image for an artist to use for making a painting or other artwork.

In some implementations, the reference image holder is configured to move a reference image held by the reference image holder to a desired location and/or position for viewing, studying, and/or otherwise using by an artist while making a painting or other artwork.

In some implementations, the reference image holder is configured to illuminate a reference image held by the reference image holder to allow an artist to view, study, and/or otherwise use the reference image while making a painting or other artwork.

In some implementations, the reference image holder is configured to be portable.

In some implementations, the reference image holder is configured to be positioned on a surface, such as a floor or a tabletop.

In some implementations, the reference image holder may be configured to hold a reference image for use by painters, sculptors, architects, tattoo artists, and/or other visual artists.

In some implementations, a method for using the reference image holder comprises positioning the reference image holder on a surface, such as a tabletop or floor, attaching a reference image to the reference image holder for a user, such as an artist, to use the reference image, and using the reference image to make a painting or other artwork while held by the reference image holder.

Figure 1A:
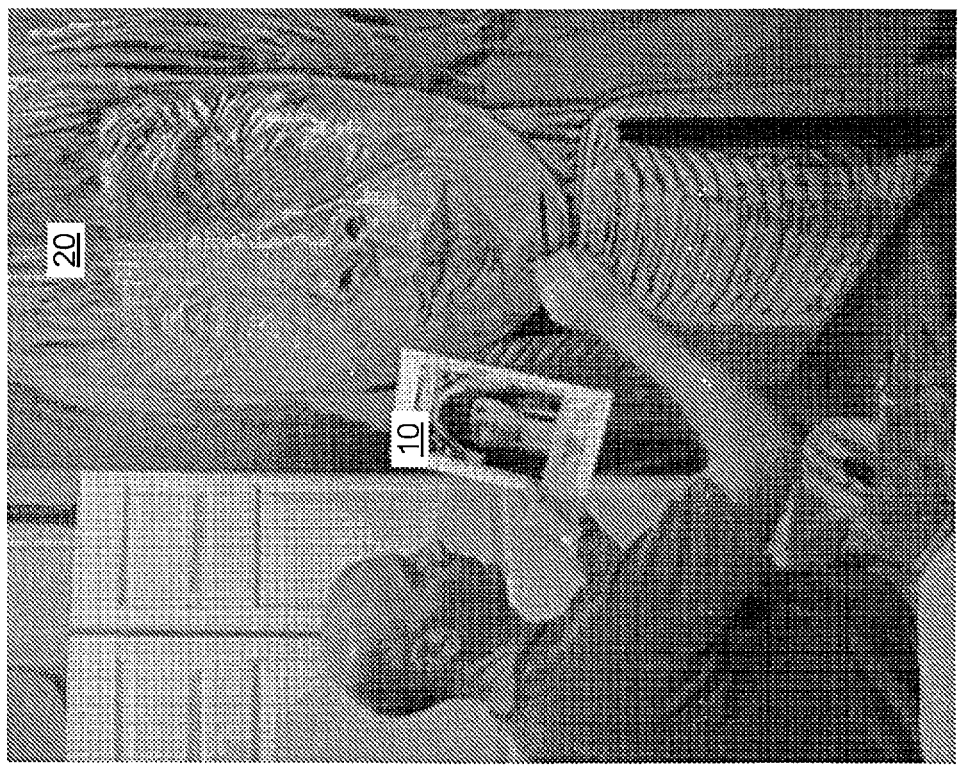
FIGS. 1A and 1B illustrate example existing ways of holding a reference image.
Figure 1B:

As shown in FIGS. 1A and 1B, artists often use reference images 10 to help them make paintings 20 or other artwork. A reference image 10 can help an artist gain useful information, such as spatial relationships, colors, and forms, that can inform and/or inspire the artist for making a painting 20 or other artwork. For example, a reference image 10 may be a photograph, a drawing, a painting, or other visual object that an artist can view, study, or otherwise utilize for making a painting 20 or other artwork.

FIGS. 1A and 1B illustrate example existing ways of holding a reference image 10. For example, as shown in FIG. 1A, artists usually have to hold a reference image 10 by hand to use the reference image 10 while making a painting 20 or other artwork. As shown in FIG. 1B, artists may alternately have to prop a reference image 10 against an object 30 to use the reference image 10 while making a painting 20 or other artwork. Such existing ways do not allow artists to conveniently hold (e.g., hands-free) and move around (e.g., to various viewing positions, locations, orientations, etc.) a reference image 10 while making a painting 20 or other artwork.

Figure 2:
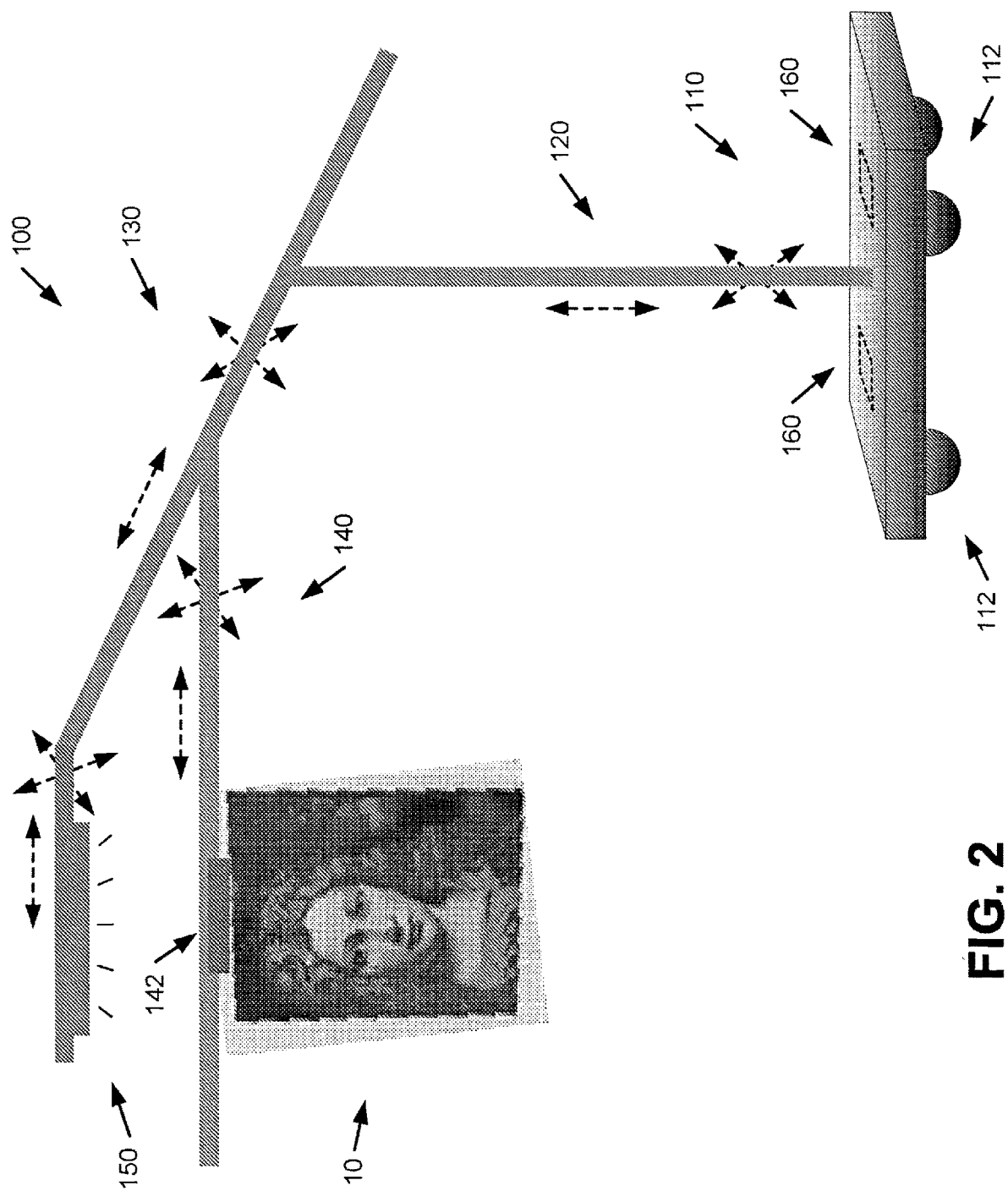
FIG. 2 is an environmental, perspective view of an implementation or embodiment of a reference image holder according to the present invention.
Figure 3:
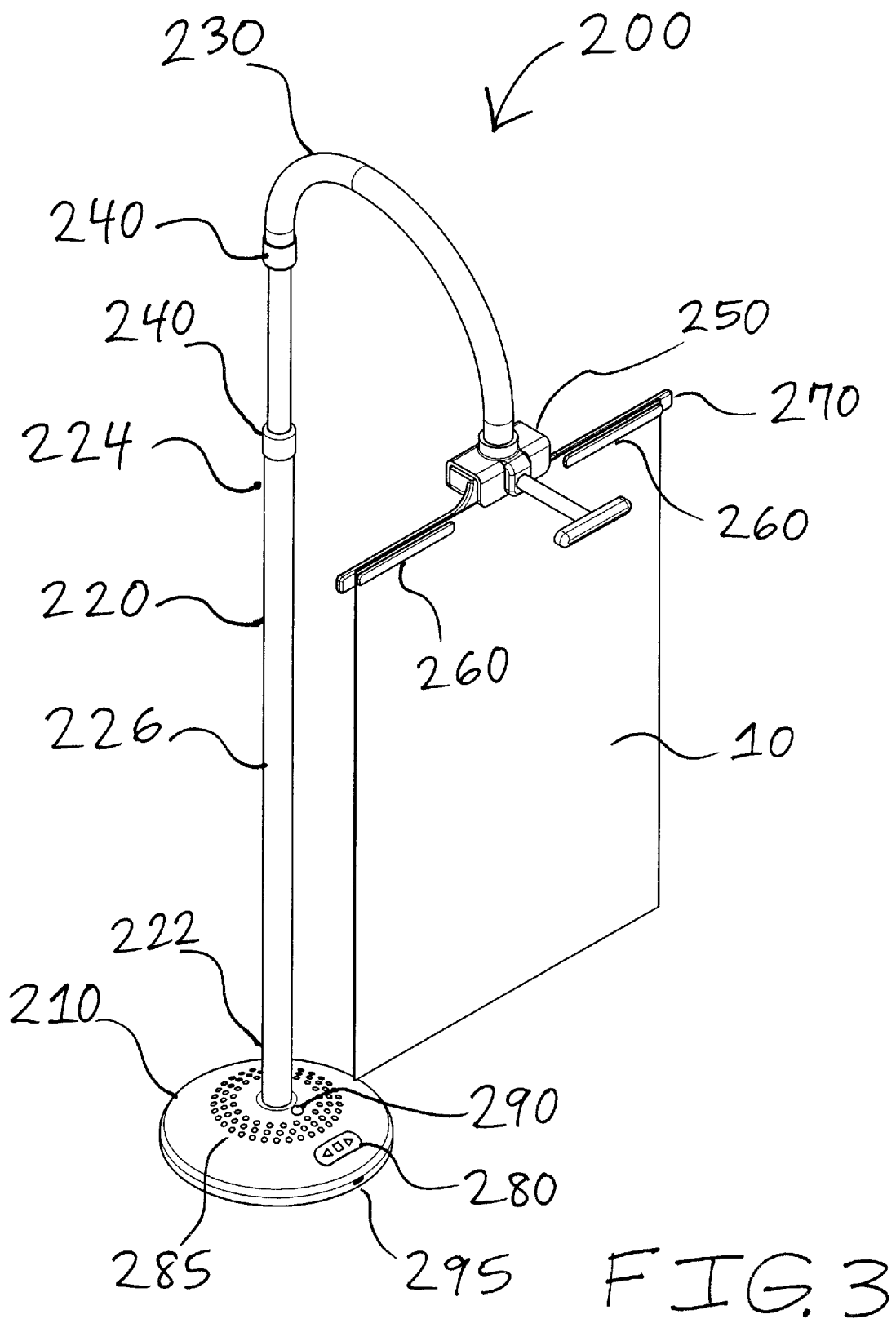
FIG. 3 is an environmental, perspective view of another implementation or embodiment of a reference image holder according to the present invention.
Figure 4:
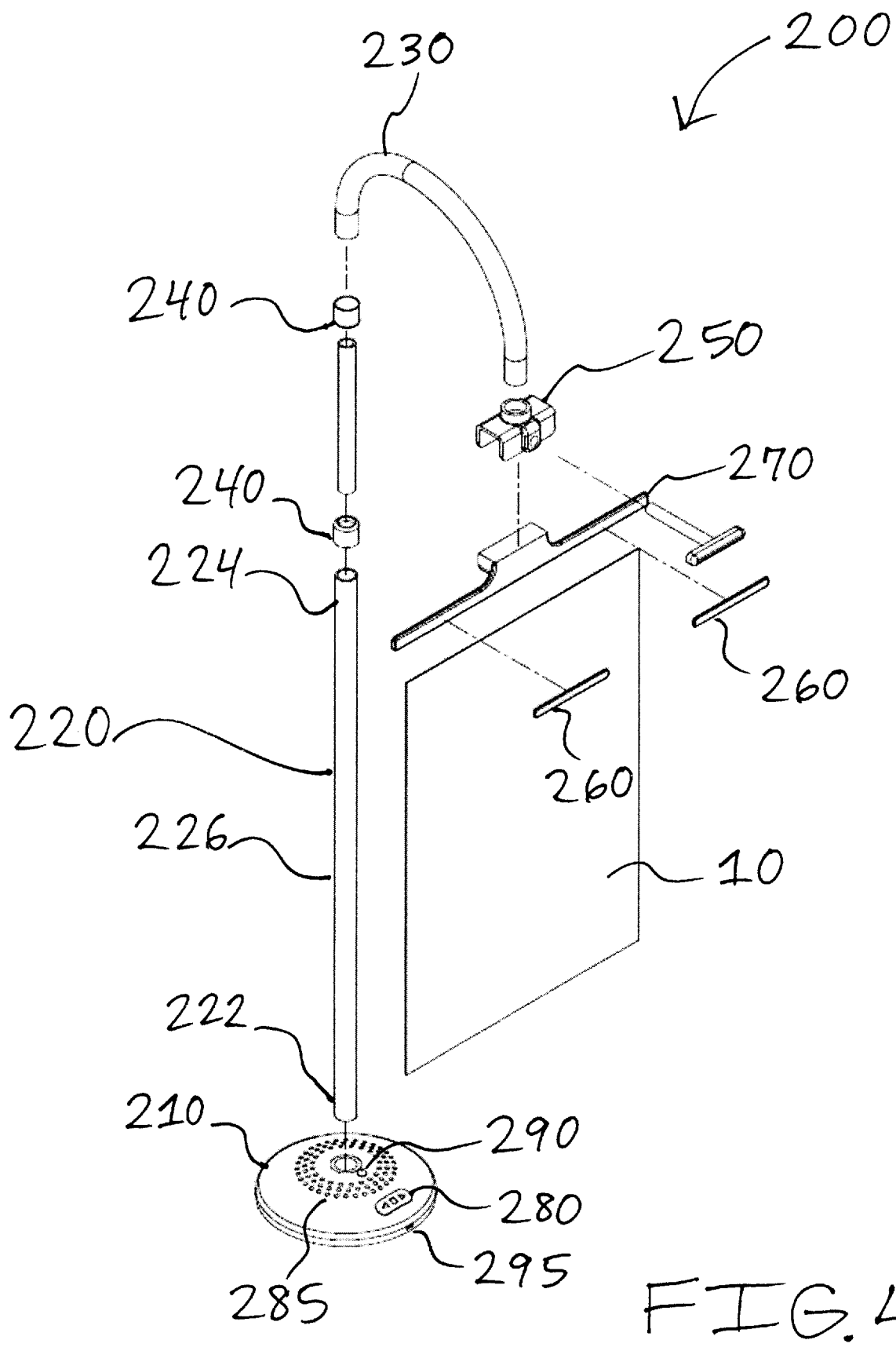
FIG. 4 is an environmental, exploded, perspective view of the reference image holder of FIG. 3.
Figure 5:
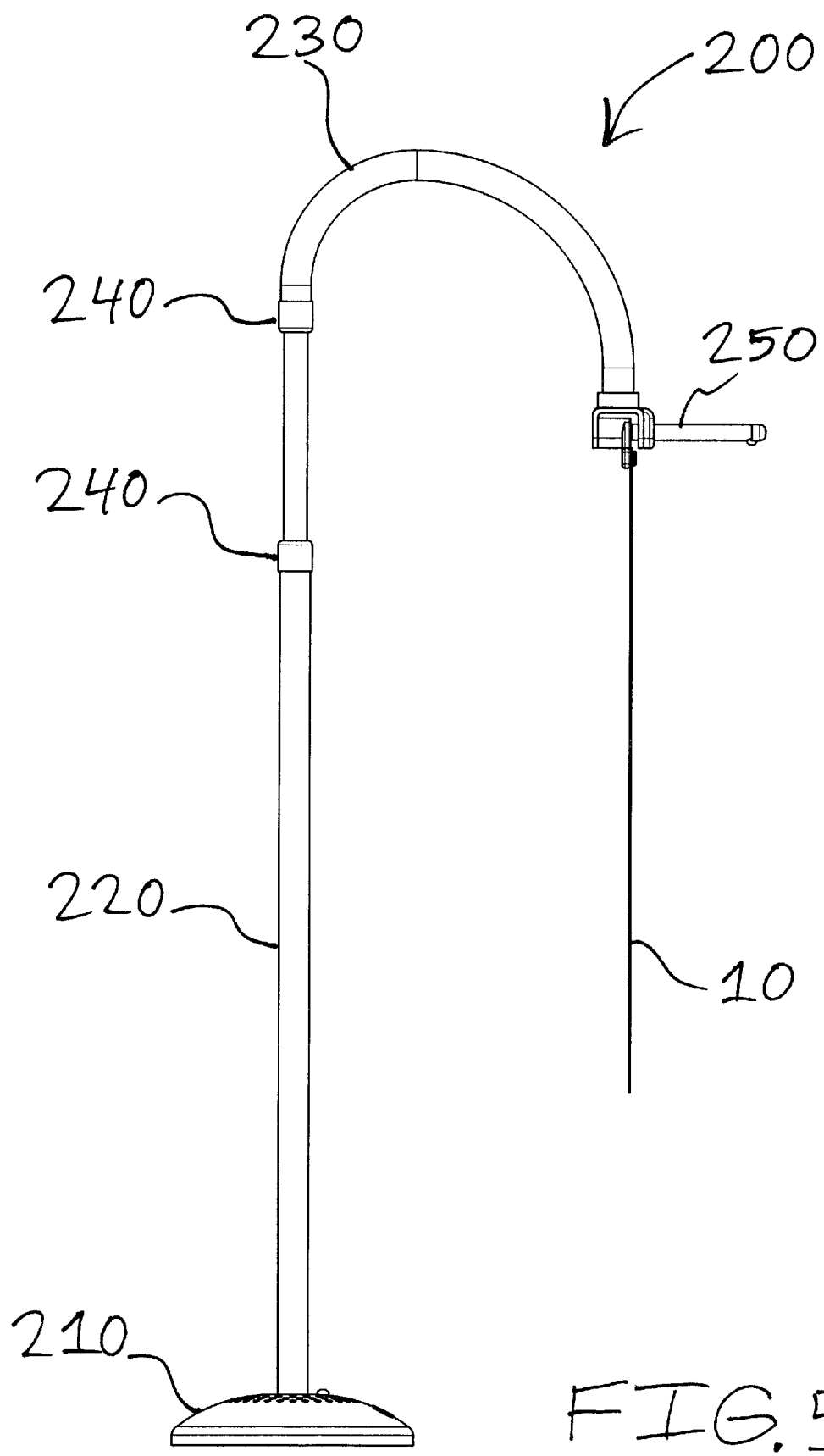
FIG. 5 is an environmental, side view of the reference image holder of FIG. 3.
Figure 6:
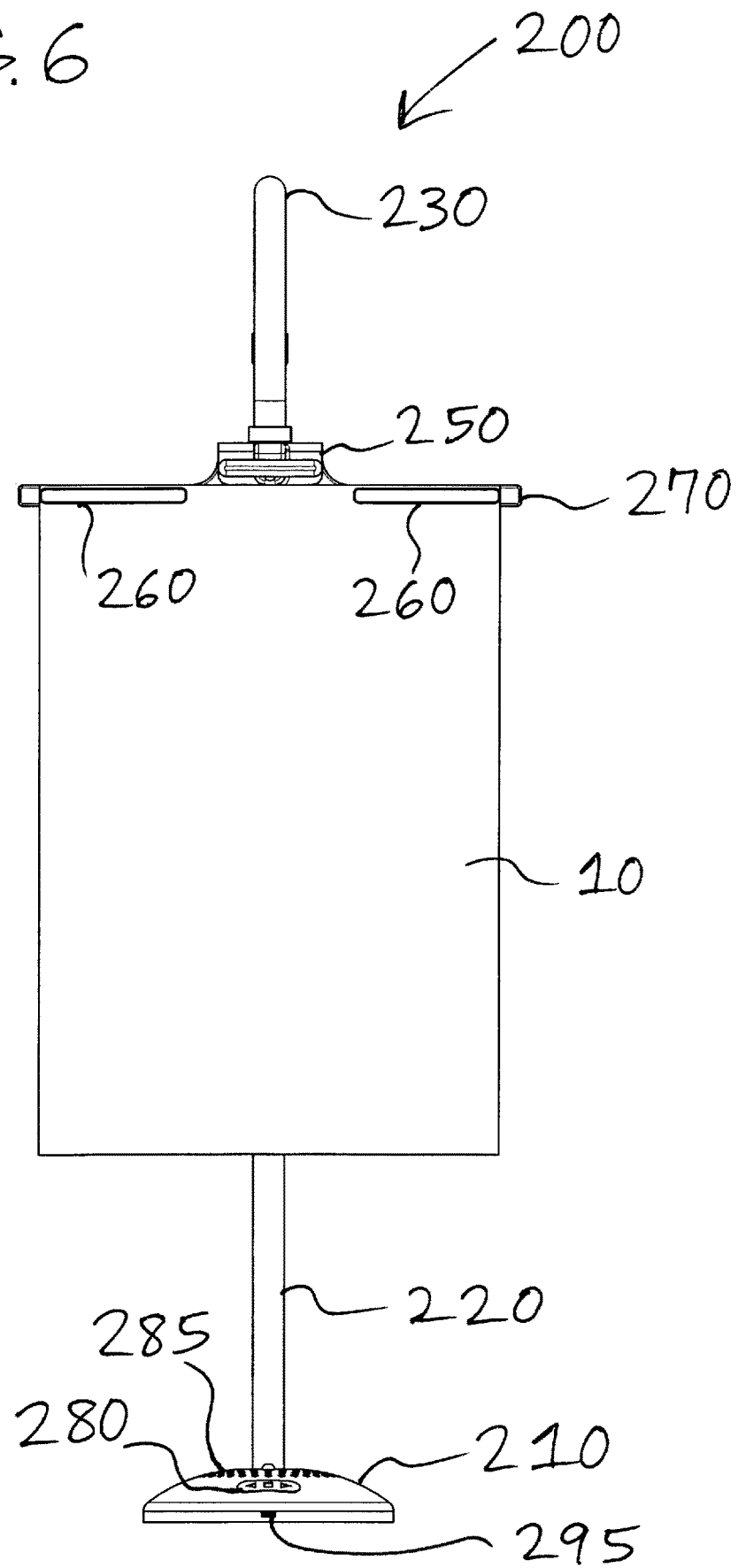
FIG. 6 is an environmental, front view of the reference image holder of FIG. 3.
Figure 7:
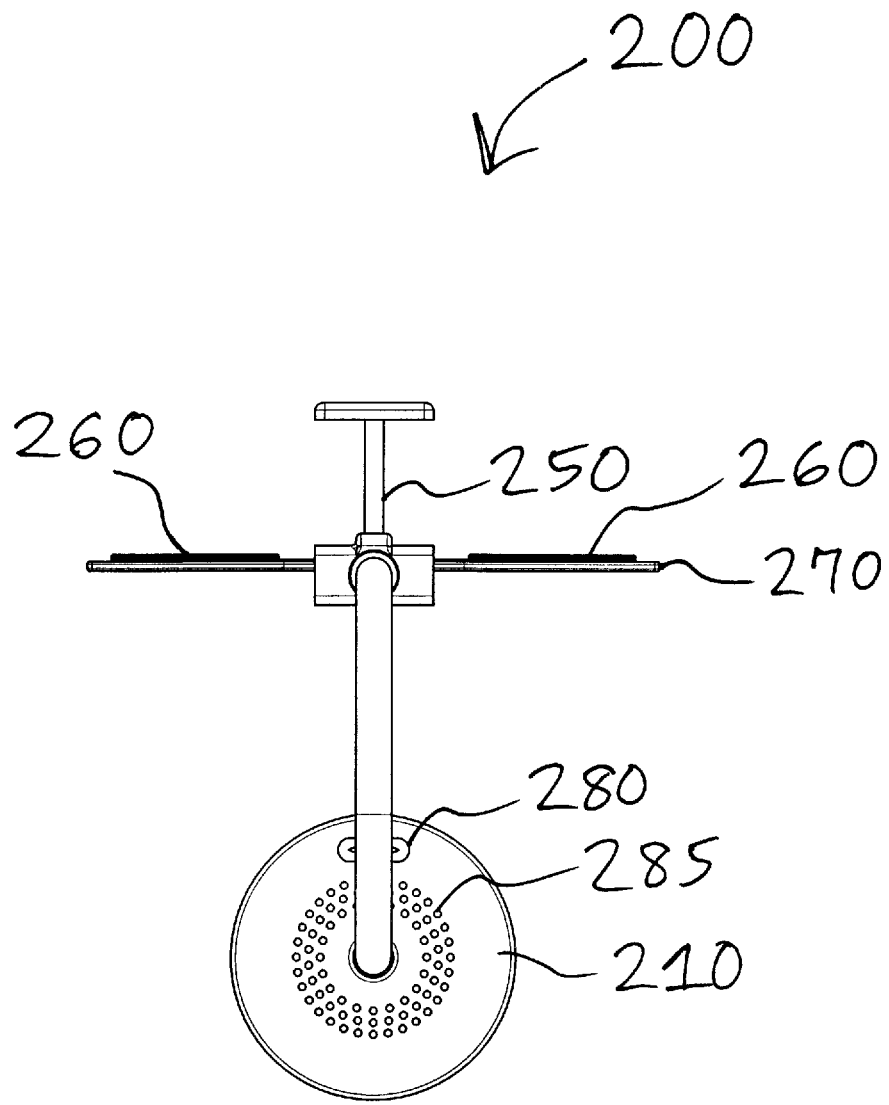
FIG. 7 is an environmental, top view of the reference image holder of FIG. 3.

FIG. 2 illustrates an implementation of an example reference image holder 100 according to the present disclosure. As shown in FIG. 2, in some implementations, the reference image holder 100 comprises a base 110, a pole 120, a first arm 130, and a second arm 140.

In some implementations, the reference image holder 100 may further comprise a light source 150. In some implementations, the reference image holder 100 may further comprise one or more speakers 160.

In some implementations, the reference image holder 100 may further comprise any other suitable components and/or accessories.

In some implementations, the base 110 may be any suitable shape that allows the base 110 to support the reference image holder 100 for use. For example, in some implementations, the base 110 may be at least generally rectangular prism shaped. In some implementations, the base 110 may be at least generally cylindrical or disk shaped.

In some implementations, the base 110 may be an at least generally elongated shape. In some implementations, the base 110 may be any other suitable shape.

In some implementations, the base 110 may be any suitable size that allows the base 110 to support the reference image holder 100 for use.

In some implementations, the base 110 may have any other suitable features that allow the base 110 to support the reference image holder 100 for use.

As shown in FIG. 2, in some implementations, the base 110 may further comprise one or more wheels 112. For example, in some implementations, the base 110 may comprise four wheels 112. In some implementations, the base 110 may comprise less than four wheels 112. In some implementations, the base 110 may comprise more than four wheels 112.

In some implementations, the wheels 112 may be attached to one or more bottom sides or downward facing surfaces of the base 110. In some implementations, the wheels 112 may be attached to one or more sides or sideward facing surfaces of the base 110. In some implementations, the wheels 112 may be attached to one or more of any other suitable sides or surfaces of the base 110.

In some implementations, the wheels 112 may be attached at least partly concealed or recessed within the base 110.

In some implementations, the wheels 112 may be attached to the base 110 such that the wheels 112 can swivel or otherwise move at the attachment to the base 110. For example, in some implementations, the wheels 112 may be attached to the base 110 such that the wheels 112 can swivel to allow the reference image holder 100 to be moved or turned on the wheels 112 in various directions.

In some implementations, one or more of the wheels 112 may be attached to the base 110 such that the respective wheel(s) 112 are fixed or otherwise not moveable at the attachment to the base 110.

In some implementations, the wheels 112 may be attached at any other suitable location of the base 110. In some implementations, the wheels 112 may be attached to the base 110 in any other suitable configuration. In some implementations, the wheels 112 may be attached to the base 110 in any other suitable way.

In some implementations, the wheels 112 may be attachable to the base 110. In some implementations, the wheels 112 may be removable from the base 110.

In some implementations, the wheels 112 may be any suitable type of wheels. In some implementations, the wheels 112 may be any suitable shape of wheels. In some implementations, the wheels 112 may be any suitable configuration of wheels.

In some implementations, the wheels 112 are configured to allow the reference image holder 100 to be moved around on the base 110. For example, in some implementations, the wheels 112 are configured to allow the reference image holder 100 to be moved around on a table (e.g., a tabletop), floor, or other surface.

In some implementations, the wheels 112 are configured to allow the reference image holder 100 to be moved when a user pushes, pulls, or otherwise moves the reference image holder 100. In some implementations, the wheels 112 are configured to not allow the reference image holder 100 to move when the user does not push, pull, or otherwise move the reference image holder 100.

For example, in some implementations, the wheels 112 may be configured to brake, lock, or otherwise not move to keep the reference image holder 100 in a position when not being moved. In some implementations, the wheels 112 may include a brake or locking mechanism that allows the wheels 112 to not move to keep the reference image holder 100 in a position when not being moved.

In some implementations, the wheels 112 may comprise any other suitable feature or configuration that allows the wheels 112 to not move to keep the reference image holder 100 in a position when not being moved by a user. In some implementations, the wheels 112 may be configured to provide any other suitable features of the reference image holder 100.

As shown in FIG. 2, in some implementations, the base 110 is configured to support the reference image holder 100 to stand on any suitable surface, such as a tabletop or floor. For example, in some implementations, the base 110 may be similar to a pedestal, stand, or other support.

In some implementations, the base 110 is configured to support the reference image holder 100 to stand on the surface to use the reference image holder 100 to hold a reference image 10, as described below.

In some implementations, the base 110 is configured to support the reference image holder 100 to move around on the surface to use the reference image holder 100. For example, in some implementations, the base 110 is configured to support the reference image holder 100 to move around on the wheels 112 on the surface to use the reference image holder 100.

In some implementations, the base 110 may be configured to provide any other suitable features of the reference image holder 100.

As shown in FIG. 2, in some implementations, the pole 120 is at least generally elongated. In some implementations, the pole 120 may be any suitable at least generally elongated shape that allows the pole 120 to extend upward (or vertically) from the base 110 and support the reference image holder 100 for use. For example, in some implementations, the pole 120 may be at least generally elongated and cylindrical shaped. In some implementations, the pole 120 may be at least generally elongated and rectangular prism shaped.

In some implementations, the pole 120 may be any other suitable at least generally elongated shape. In some implementations, the pole 120 may be any other suitable shape.

In some implementations, the pole 120 may be any suitable size that allows the pole 120 to extend upward from the base 110 and support the reference image holder 100 for use.

In some implementations, the pole 120 may have any other suitable features that allow the pole 120 to extend upward from the base 110 and support the reference image holder 100 for use.

As shown in FIG. 2, in some implementations, the pole 120 is attached or connected to the base 110. For example, in some implementations, the pole 120 is attached to a top or upward facing surface or portion of the base 110. In some implementations, the pole 120 may be attached to any other suitable part of the base 110.

In some implementations, the pole 120 may be attached to the top surface or other suitable part of the base 110 at any suitable position. For example, in some implementations, the pole 120 may be attached to an at least generally centered position of the top surface or other suitable part of the base 110.

In some implementations, the pole 120 is attached to the base 110 at the bottom or distal end of the pole 120. In some implementations, the pole 120 may be attached to the base 110 at any other suitable part of the pole 120.

In some implementations, the pole 120 may be removably attached to the base 110 such that the pole 120 can be removed and reattached to the base 110.

In some implementations, the pole 120 extends at least generally upward (or vertically) from the base 110. For example, in some implementations, the pole 120 extends at least generally perpendicular from the attachment to the upward facing surface or portion of the base 110.

In some implementations, the pole 120 extends at least generally upward from the base 110 when the base 110 is positioned on an at least generally horizontal surface, such as a tabletop or floor.

In some implementations, the pole 120 may extend in any other suitable way from the attachment to the base 110 such that the pole 120 extends at least generally upward from the base 110.

As shown in FIG. 2, in some implementations, the pole 120 is configured to extend upward from the base 110 and support the reference image holder 100 for use. In some implementations, the pole 120 is configured to support the reference image holder 100 for use with the base 110 positioned on a tabletop, floor, or other suitable surface.

In some implementations, the pole 120 is configured to support the reference image holder 100 to use the reference image holder 100 to hold a reference image 10, as described below.

In some implementations, the pole 120 may be configured to be adjustable. For example, in some implementations, the pole 120 may be configured to be adjustable in length. In some implementations, the pole 120 may be so adjustable such that the length and/or height of the reference image holder 100 is adjustable.

In some implementations, the pole 120 may be so adjustable such that the height of a reference image 10 held by the reference image holder 100 can be adjusted. In some implementations, the pole 120 may be so adjustable such that the height of the reference image 10 above the base 110 and/or the supporting surface of the reference image holder 100, such as a tabletop or floor, is adjustable.

In some implementations, the pole 120 may be so adjustable by being telescopingly configured. For example, in some implementations, the pole 120 may comprise two or more sections that are telescopingly configured such that the sections can be extended apart and retracted together. In some implementations, the pole 120 may be telescopingly configured in any other suitable way.

In some implementations, the pole 120 may be configured to be adjustable in length in any other suitable way. In some implementations, the pole 120 may be configured to be adjustable in any other suitable way.

In some implementations, the pole 120 may be configured to be moveable in any suitable way, such as similar to the first arm 130 and/or the second arm 140 described below.

In some implementations, the pole 120 may be configured to provide any other suitable features of the reference image holder 100.

As shown in FIG. 2, in some implementations, the first arm 130 is at least generally elongated. In some implementations, the first arm 130 may be any suitable at least generally elongated shape that allows the first arm 130 to extend or moveably extend from the pole 120 for use of the reference image holder 100. For example, in some implementations, the first arm 130 may be at least generally elongated and cylindrical shaped. In some implementations, the first arm 130 may be at least generally elongated and rectangular prism shaped.

In some implementations, the first arm 130 may be any other suitable at least generally elongated shape. In some implementations, the first arm 130 may be any other suitable shape.

In some implementations, the first arm 130 may be any suitable size that allows the first arm 130 to extend or moveably extend from the pole 120 for use of the reference image holder 100.

In some implementations, the first arm 130 may have any other suitable features that allow the first arm 130 to extend or moveably extend from the pole 120 for use of the reference image holder 100.

As shown in FIG. 2, in some implementations, the first arm 130 is attached to the pole 120. For example, in some implementations, the first arm 130 is attached to the top or distal end of the pole 120. In some implementations, the first arm 130 is attached to the pole 120 opposite the attachment of the pole 120 to the base 110. In some implementations, the first arm 130 may be attached to any other suitable part of the pole 120.

In some implementations, the first arm 130 may be attached to the pole 120 at least generally midway along the length of the first arm 130. In some implementations, the first arm 130 may be attached to the pole 120 at any other suitable position along the length (i.e., between the lengthwise ends) of the first arm 130.

In some implementations, the first arm 130 may be attached to the pole 120 at one end of the first arm 130. In some implementations, the first arm 130 may be attached to the pole 120 at any other suitable position of the first arm 130.

In some implementations, the first arm 130 may be adjustably or repositionably attached to the pole 120 such that the position of the first arm 130 that is attached to the pole 120 can be adjusted or otherwise changed. In some implementations, the first arm 130 may be attached to the pole 120 in any other suitable configuration.

In some implementations, the first arm 130 may be removably attached to the pole 120 such that the first arm 130 can be removed and reattached to the pole 120.

As shown in FIG. 2, in some implementations, the first arm 130 extends from the pole 120. For example, in some implementations, the first arm 130 may extend at least generally horizontally from the attachment to the pole 120, which as described above extends at least generally vertically from the base 110.

In some implementations, the first arm 130 moveably extends from the pole 120. For example, in some implementations, the first arm 130 is attached to and extends from the pole 120 such that first arm 130 is moveable by a user in one or more directions.

In some implementations, the first arm 130 may be moveable at least generally vertically, e.g. upward and/or downward, from the attachment to the pole 120. In some implementations, the first arm 130 may be moveable at least generally horizontally, e.g. leftward and/or rightward, from the attachment to the pole 120.

In some implementations, the first arm 130 may be moveable at least generally diagonally, e.g. partly vertically and partly horizontally, from the attachment to the pole 120.

In some implementations, the first arm 130 may be moveable in any other suitable directions from the attachment to the pole 120.

In some implementations, the first arm 130 may extend from the pole 120 in any other suitable way. In some implementations, the first arm 130 may moveably extend from the pole 120 in any other suitable way.

As shown in FIG. 2, in some implementations, the first arm 130 is configured to be moveable by a user in one or more directions, such as described above. In some implementations, the first arm 130 is configured to be moveable by a user in one or more directions from the attachment of the first arm 130 to the pole 120. For example, in some implementations, the first arm 130 is configured to be at least generally rigid, and the attachment of the first arm 130 to the pole 120 is configured to allow the first arm 130 to be moveable in one or more directions.

In some implementations, the attachment of the first arm 130 to the pole 120 may comprise a hinge configured to allow the first arm 130 to swivel, rotate, or otherwise move in one or more directions. In some implementations, the attachment of the first arm 130 to the pole 120 may comprise a ball and socket joint configured to allow the first arm 130 to swivel, rotate, or otherwise move in one or more directions.

In some implementations, the attachment of the first arm 130 to the pole 120 may comprise a universal joint configured to allow the first arm 130 to swivel, rotate, or otherwise move in one or more directions. In some implementations, the attachment of the first arm 130 to the pole 120 may comprise any other suitable configuration and/or mechanism configured to allow the first arm 130 to swivel, rotate, or otherwise move in one or more directions.

Alternately, in some implementations, the attachment of the first arm 130 to the pole 120 may be configured to be at least generally rigid, and the first arm 130 may be configured to be at least generally bendable or otherwise flexible to allow the first arm 130 to be moveable in one or more directions. For example, in some implementations, the first arm 130 may comprise a flexible and/or gooseneck arm configured to allow the first arm 130 to swivel, rotate, or otherwise move in one or more directions.

In some implementations, the first arm 130 may comprise any other suitable configuration and/or mechanism configured to allow the first arm 130 to swivel, rotate, or otherwise move in one or more directions.

In some implementations, the first arm 130 is configured to be moveable by a user in one or more directions, as described above, to adjust the height or vertical positioning of a reference image 10 held by the reference image holder 100. In some implementations, the first arm 130 may be configured to be moveable by a user in one or more directions to adjust the horizontal positioning of a reference image 10 held by the reference image holder 100.

In some implementations, the first arm 130 may be configured to be moveable by a user in one or more directions to adjust the orientation, such as the tilt or viewing angle, of a reference image 10 held by the reference image holder 100. In some implementations, the first arm 130 may be configured to be moveable by a user in one or more directions to adjust any other suitable positioning of a reference image 10 held by the reference image holder 100.

In some implementations, the first arm 130 may be configured to be adjustable. For example, in some implementations, the first arm 130 may be configured to be adjustable in length. In some implementations, the first arm 130 may be so adjustable such that the positioning of a reference image 10 held by the reference image holder 100 is adjustable, such as described above.

In some implementations, the first arm 130 may be so adjustable by being telescopingly configured. For example, in some implementations, the first arm 130 may comprise two or more sections that are telescopingly configured such that the sections can be extended apart and retracted together. In some implementations, the first arm 130 may be telescopingly configured in any other suitable way.

In some implementations, the first arm 130 may be configured to be adjustable in length in any other suitable way. In some implementations, the first arm 130 may be configured to be adjustable in any other suitable way.

In some implementations, the first arm 130 may be configured to provide any other suitable features of the reference image holder 100.

As shown in FIG. 2, in some implementations, the second arm 140 comprises an attachment mechanism 142, as described below.

As shown in FIG. 2, in some implementations, the second arm 140 is at least generally elongated. In some implementations, the second arm 140 may be any suitable at least generally elongated shape that allows the second arm 140 to extend or moveably extend from the first arm 130 for use of the reference image holder 100. For example, in some implementations, the second arm 140 may be at least generally elongated and cylindrical shaped. In some implementations, the second arm 140 may be at least generally elongated and rectangular prism shaped.

In some implementations, the second arm 140 may be any other suitable at least generally elongated shape. In some implementations, the second arm 140 may be any other suitable shape.

In some implementations, the second arm 140 may be any suitable size that allows the second arm 140 to extend or moveably extend from the first arm 130 for use of the reference image holder 100.

In some implementations, the second arm 140 may have any other suitable features that allow the second arm 140 to extend or moveably extend from the first arm 130 for use of the reference image holder 100.

As shown in FIG. 2, in some implementations, the second arm 140 is attached to the first arm 130. For example, in some implementations, the second arm 140 may be attached to the first arm 130 at least generally midway along the length of the first arm 130. In some implementations, the second arm 140 may be attached to the first arm 130 at any other suitable position along the length (i.e., between the lengthwise ends) of the first arm 130.

In some implementations, the second arm 140 is attached to the first arm 130 at one end of the second arm 140. In some implementations, the second arm 140 may be attached to the first arm 130 at any other suitable part of the second arm 140.

In some implementations, the second arm 140 may be adjustably or repositionably attached to the first arm 130 such that the position at which the second arm 140 is attached to the first arm 130 can be adjusted or otherwise changed. In some implementations, the second arm 140 may be attached to the first arm 130 in any other suitable configuration.

In some implementations, the second arm 140 may be removably attached to the first arm 130 such that the second arm 140 can be removed and reattached to the first arm 130.

As shown in FIG. 2, in some implementations, the second arm 140 extends from the first arm 130. For example, in some implementations, the second arm 140 may extend at least generally horizontally from the attachment to the first arm 130, which as described above extends from the pole 120.

In some implementations, the second arm 140 moveably extends from the first arm 130. For example, in some implementations, the second arm 140 is attached to and extends from the first arm 130 such that second arm 140 is moveable by a user in one or more directions.

In some implementations, the second arm 140 may be moveable at least generally vertically, e.g. upward and/or downward, from the attachment to the first arm 130. In some implementations, the second arm 140 may be moveable at least generally horizontally, e.g. leftward and/or rightward, from the attachment to the first arm 130.

In some implementations, the second arm 140 may be moveable at least generally diagonally, e.g. partly vertically and partly horizontally, from the attachment to the first arm 130. In some implementations, the second arm 140 may be moveable in any other suitable directions from the attachment to the first arm 130.

In some implementations, the second arm 140 may extend from the first arm 130 in any other suitable way. In some implementations, the second arm 140 may moveably extend from the first arm 130 in any other suitable way.

As shown in FIG. 2, in some implementations, the second arm 140 is configured to be moveable by a user in one or more directions, such as described above. In some implementations, the second arm 140 is configured to be moveable by a user in one or more directions from the attachment of the second arm 140 to the first arm 130. For example, in some implementations, the second arm 140 is configured to be at least generally rigid, and the attachment of the second arm 140 to the first arm 130 is configured to allow the second arm 140 to be moveable in one or more directions.

In some implementations, the attachment of the second arm 140 to the first arm 130 may comprise a hinge configured to allow the second arm 140 to swivel, rotate, or otherwise move in one or more directions. In some implementations, the attachment of the second arm 140 to the first arm 130 may comprise a ball and socket joint configured to allow the second arm 140 to swivel, rotate, or otherwise move in one or more directions.

In some implementations, the attachment of the second arm 140 to the first arm 130 may comprise a universal joint configured to allow the second arm 140 to swivel, rotate, or otherwise move in one or more directions. In some implementations, the attachment of the second arm 140 to the first arm 130 may comprise any other suitable configuration and/or mechanism configured to allow the second arm 140 to swivel, rotate, or otherwise move in one or more directions.

Alternately, in some implementations, the attachment of the second arm 140 to the first arm 130 may be configured to be at least generally rigid, and the second arm 140 may be configured to be at least generally bendable or otherwise flexible to allow the second arm 140 to be moveable in one or more directions. For example, in some implementations, the second arm 140 may comprise a flexible and/or gooseneck arm configured to allow the second arm 140 to swivel, rotate, or otherwise move in one or more directions.

In some implementations, the second arm 140 may comprise any other suitable configuration and/or mechanism configured to allow the second arm 140 to swivel, rotate, or otherwise move in one or more directions.

As shown in FIG. 2, in some implementations, the attachment mechanism 142 comprises one or more components that are configured to removably attach a reference image 10 to the second arm 140 for use of the reference image holder 100. For example, in some implementations, the attachment mechanism 142 may comprise one or more clips. In some implementations, the attachment mechanism 142 may comprise one or more components that are at least generally similar to a binder clip.

In some implementations, the attachment mechanism 142 may comprise one or more components that are at least generally similar to a paper clamp. In some implementations, the attachment mechanism 142 may comprise one or more components that are at least generally similar to a clipboard clamp. In some implementations, the attachment mechanism 142 may comprise one or more components that are at least generally similar to an easel clamp.

In some implementations, the attachment mechanism 142 may comprise one or more of any other suitable component(s) that allows a user to removably attach a reference image 10 to the second arm 140 for use of the reference image holder 100.

In some implementations, the attachment mechanism 142 may have any suitable shape that allows a user to removably attach a reference image 10 to the second arm 140 for use of the reference image holder 100.

In some implementations, the attachment mechanism 142 may have any suitable size that allows a user to removably attach a reference image 10 to the second arm 140 for use of the reference image holder 100.

In some implementations, the attachment mechanism 142 may have any other suitable configuration that allows a user to removably attach a reference image 10 to the second arm 140 for use of the reference image holder 100.

As shown in FIG. 2, in some implementations, the attachment mechanism 142 is attached, connected, or otherwise extends from the second arm 140. For example, in some implementations, the attachment mechanism 142 may be attached to the second arm 140 at least generally midway along the length of the second arm 140. In some implementations, the attachment mechanism 142 may be attached to the second arm 140 at any other suitable position along the length (i.e., between the lengthwise ends) of the second arm 140.

In some implementations, the attachment mechanism 142 may extend at least partly along the length of the second arm 140 such that the second arm has a configuration of a paper clamping (or paper holding) blade, bracket, or similar component.

In some implementations, the attachment mechanism 142 may be attached to the second arm 140 at any suitable part of the attachment mechanism 142.

In some implementations, the attachment mechanism 142 may be moveably attached to the second arm 140, such that the attachment mechanism 142 can be moved in any suitable direction for use of the reference image holder 100.

In some implementations, the attachment mechanism 142 may be adjustably or repositionably attached to the second arm 140 such that the position at which the attachment mechanism 142 is attached to the second arm 140 can be adjusted or otherwise changed. In some implementations, the attachment mechanism 142 may be attached to the second arm 140 in any other suitable configuration.

In some implementations, the attachment mechanism 142 may be removably attached to the second arm 140 such that the attachment mechanism 142 can be removed and reattached to the second arm 140.

In some implementations, the attachment mechanism 142 may be attached to the second arm 140 in any other suitable way and/or configuration such that a user can removably attach a reference image 10 to the second arm 140 by the attachment mechanism 142 for use of the reference image holder 100.

As shown in FIG. 2, in some implementations, the attachment mechanism 142 is configured to removably attach a reference image 10 to the second arm 140 for use of the reference image holder 100. In some implementations, the attachment mechanism 142 may be configured to attach a reference image 10 to the second arm 140 in any other suitable way for use of the reference image holder 100.

In some implementations, the second arm 140 is configured to be moveable by a user in one or more directions, as described above, to adjust the positioning of a reference image 10 held by the reference image holder 100. For example, in some implementations, the second arm 140 may be configured to be moveable by a user in one or more directions to adjust the horizontal positioning of a reference image 10 held by the reference image holder 100.

In some implementations, the second arm 140 may be configured to be moveable by a user in one or more directions to adjust the height or vertical positioning of a reference image 10 held by the reference image holder 100.

In some implementations, the second arm 140 may be configured to be moveable by a user in one or more directions to adjust the orientation, such as the tilt or viewing angle, of a reference image 10 held by the reference image holder 100. In some implementations, the second arm 140 may be configured to be moveable by a user in one or more directions to adjust any other suitable positioning of a reference image 10 held by the reference image holder 100.

In some implementations, the second arm 140 may be configured to be adjustable. For example, in some implementations, the second arm 140 may be configured to be adjustable in length. In some implementations, the second arm 140 may be so adjustable such that the positioning of a reference image 10 held by the reference image holder 100 is adjustable, such as described above.

In some implementations, the second arm 140 may be so adjustable by being telescopingly configured. For example, in some implementations, the second arm 140 may comprise two or more sections that are telescopingly configured such that the sections can be extended apart and retracted together. In some implementations, the second arm 140 may be telescopingly configured in any other suitable way.

In some implementations, the second arm 140 may be configured to be adjustable in length in any other suitable way. In some implementations, the second arm 140 may be configured to be adjustable in any other suitable way.

In some implementations, the second arm 140 may be configured to provide any other suitable features of the reference image holder 100.

In some implementations, the light source 150 may comprise any suitable component(s) that can be attached (or otherwise connected or integrated) to the reference image holder 100 and provide illumination (lighting) for use of the reference image holder 100. For example, in some implementations, the light source 150 may comprise a light-emitting diode (LED) light source.

In some implementations, the light source 150 may comprise a fluorescent light source. In some implementations, the light source 150 may comprise an incandescent light source.

In some implementations, the light source 150 may comprise any other suitable type of light source.

In some implementations, the light source 150 may have any suitable shape such that the light source 150 can be attached to the reference image holder 100 and provide lighting for use of the reference image holder 100. For example, in some implementations, the light source 150 may at least generally rectangular prism shaped.

In some implementations, the light source 150 may be at least generally cylindrical or disk shaped. In some implementations, the light source 150 may be an at least generally elongated shape.

In some implementations, the light source 150 may be any suitable size such that the light source 150 can be attached to the reference image holder 100 and provide lighting for use of the reference image holder 100. For example, in some implementations, the light source 150 may be sized such that the light source 150 can provide a desirable and/or acceptable (e.g., by industry standard or other determination) lighting of a reference image 10 held by the reference image holder 100.

In some implementations, the light source 150 may have any other suitable configuration that allows the light source 150 to provide lighting for use of the reference image holder 100 with the light source 150 attached (or otherwise connected or integrated) to the reference image holder 100, such as described below. In some implementations, the light source 150 may have any other suitable features that allows the light source 150 to provide such lighting.

As shown in FIG. 2, in some implementations, the light source 150 is attached to the first arm 130. In some implementations, the light source 150 may be attached to the first arm 130 at any suitable position of the first arm 130.

For example, in some implementations, the light source 150 may be attached to the first arm 130 at any suitable position along the length (i.e., between the lengthwise ends) of the first arm 130. In some implementations, the light source 150 may be attached to the first arm 130 at either lengthwise end of the first arm 130.

In some implementations, the light source 150 may be so attached to the first arm 130 at least generally adjacent to the attachment of the second arm 140 to the first arm 130 as described above.

In some implementations, the light source 150 may be attached to the first arm 130 at any suitable part of the light source 150, such as an end or other part of the light source 150

In some implementations, the light source 150 may be adjustably or repositionably attached to the first arm 130 such that the position at which the light source 150 is attached to the first arm 130 can be adjusted or otherwise changed. In some implementations, the light source 150 may be attached to the first arm 130 in any other suitable configuration.

In some implementations, the light source 150 may be removably attached to the first arm 130 such that the light source 150 can be removed and reattached to the first arm 130.

As shown in FIG. 2, in some implementations, the light source 150 extends from the first arm 130. For example, in some implementations, the light source 150 may extend at least generally horizontally from the attachment to the first arm 130, which as described above extends from the pole 120.

In some implementations, the light source 150 moveably extends from the first arm 130. For example, in some implementations, the light source 150 is attached to and extends from the first arm 130 such that light source 150 is moveable by a user in one or more directions.

In some implementations, the light source 150 may be moveable at least generally vertically, e.g. upward and/or downward, from the attachment to the first arm 130. In some implementations, the light source 150 may be moveable at least generally horizontally, e.g. leftward and/or rightward, from the attachment to the first arm 130.

In some implementations, the light source 150 may be moveable at least generally diagonally, e.g. partly vertically and partly horizontally, from the attachment to the first arm 130. In some implementations, the light source 150 may be moveable in any other suitable directions from the attachment to the first arm 130.

In some implementations, the light source 150 may extend from the first arm 130 in any other suitable way. In some implementations, the light source 150 may moveably extend from the first arm 130 in any other suitable way.

As shown in FIG. 2, in some implementations, the light source 150 is configured to be moveable by a user in one or more directions, such as described above. In some implementations, the light source 150 is configured to be moveable by a user in one or more directions from the attachment of the light source 150 to the first arm 130. For example, in some implementations, the light source 150 is configured to be at least generally rigid, and the attachment of the light source 150 to the first arm 130 is configured to allow the light source 150 to be moveable in one or more directions.

In some implementations, the attachment of the light source 150 to the first arm 130 may comprise a hinge configured to allow the light source 150 to swivel, rotate, or otherwise move in one or more directions. In some implementations, the attachment of the light source 150 to the first arm 130 may comprise a ball and socket joint configured to allow the light source 150 to swivel, rotate, or otherwise move in one or more directions.

In some implementations, the attachment of the light source 150 to the first arm 130 may comprise a universal joint configured to allow the light source 150 to swivel, rotate, or otherwise move in one or more directions. In some implementations, the attachment of the light source 150 to the first arm 130 may comprise any other suitable configuration and/or mechanism configured to allow the light source 150 to swivel, rotate, or otherwise move in one or more directions.

Alternately, in some implementations, the attachment of the light source 150 to the first arm 130 may be configured to be at least generally rigid, and the light source 150 may be configured to be at least generally bendable or otherwise flexible to allow the light source 150 to be moveable in one or more directions. For example, in some implementations, the light source 150 may comprise a flexible and/or gooseneck arm configured to allow the light source 150 to swivel, rotate, or otherwise move in one or more directions.

In some implementations, the light source 150 may comprise any other suitable configuration and/or mechanism configured to allow the light source 150 to swivel, rotate, or otherwise move in one or more directions.

In some implementations, the light source 150 is configured to be attached (or otherwise connected or integrated) to the reference image holder 100, such as described above.

In some implementations, the light source 150 is configured to provide illumination (lighting) of a reference image 10 held by the reference image holder 100.

In some implementations, the light source 150 may be configured to be turned on and off.

In some implementations, the light source 150 may be configured to be dimmed and brightened (e.g., dimmable).

In some implementations, the light source 150 may be configured to be powered by a portable power source. For example, in some implementations, the light source 150 may be configured to be powered by a rechargeable or replaceable battery power source.

In some implementations, the light source 150 may be configured to be powered by a solar powered source. In some implementations, the light source 150 may be configured to be powered by any other suitable power source.

In some implementations, such power source for the light source 150 may be integrated to the light source 150. In some implementations, such power source for the light source 150 may be attached or otherwise integrated to the reference image holder 100.

In some implementations, the light source 150 may also or alternately be configured to be powered by a wired (e.g., wall socket plug-in) power source.

In some implementations, the light source 150 is configured to be moveable by a user in one or more directions, as described above, to adjust the positioning of the light source 150 to illuminate a reference image 10 held by the reference image holder 100. For example, in some implementations, the light source 150 may be configured to be moveable by a user in one or more directions to adjust the horizontal positioning of the light source 150.

In some implementations, the light source 150 may be configured to be moveable by a user in one or more directions to adjust the height or vertical positioning of the light source 150.

In some implementations, the light source 150 may be configured to be moveable by a user in one or more directions to adjust the orientation, such as the tilt or angle, of the light source 150 for use of the reference image holder 100. In some implementations, the light source 150 may be configured to be moveable by a user in one or more directions to adjust any other suitable positioning of the light source 150 for use of the reference image holder 100.

In some implementations, the light source 150 may be further moveable by being telescopingly configured. For example, in some implementations, the light source 150 may comprise (e.g., may be attached or otherwise integrated to) two or more sections that are telescopingly configured such that the sections can be extended apart and retracted together. In some implementations, the light source 150 may be telescopingly configured in any other suitable way.

In some implementations, the light source 150 may be configured to be moveable in any other suitable way.

In some implementations, the light source 150 may be configured to be moveable as described above to also allow the light source 150 to be positioned respective to any suitable component of the reference image holder 100 for use of the reference image holder 100. For example, in some implementations, the light source 150 may be so configured to allow the light source 150 to be positioned above or otherwise respective to the second arm 140 to illuminate a reference image 10 held by the reference image holder 100.

In some implementations, the light source 150 may be configured to provide any other suitable features of the reference image holder 100.

In some implementations, the speakers 160 may comprise any suitable speakers that can be attached (or otherwise connected or integrated) to the reference image holder 100 and provide an audio output (e.g., music, dialogue, etc.), such as while using the reference image holder 100. For example, in some implementations, the speakers 160 may comprise portable wireless speakers. In some implementations, the speakers 160 may comprise any other suitable type of speakers.

In some implementations, the speakers 160 may have any suitable shape such that the speakers 160 can be attached to the reference image holder 100 and provide audio output, such as while using the reference image holder 100. For example, in some implementations, the speakers 160 may at least generally rectangular prism shaped. In some implementations, the speakers 160 may be at least generally cylindrical or disk shaped.

In some implementations, the speakers 160 may be any suitable size such that the speakers 160 can be attached to the reference image holder 100 and provide audio output, such as while using the reference image holder 100. For example, in some implementations, the speakers 160 may be sized such that the speakers 160 can be attached to the base 110 or other suitable part of the reference image holder 100.

In some implementations, the speakers 160 may have any other suitable configuration that allows the speakers 160 to provide audio output, such as while using the reference image holder 100, with the speakers 160 attached (or otherwise connected or integrated) to the reference image holder 100, such as described below. In some implementations, the speakers 160 may have any other suitable features that allows the speakers 160 to provide such audio output.

As shown in FIG. 2, in some implementations, the speakers 160 may be attached to the base 110. In some implementations, the speakers 160 may be attached to the base 110 at any suitable position of the base 110. For example, in some implementations, the speakers 160 may be attached to the base 110 on any suitable surface of the base 110.

In some implementations, the speakers 160 may be attached to the base 110 such that the speakers 160 are at least partly concealed. For example, in some implementations, the speakers 160 may be attached to the base 110 in a downward facing cavity of the base 110. In some implementations, the speakers 160 may be attached to the base 110 within an interior portion of the base 110.

In some implementations, the speakers 160 may be moveably attached to the base 110 such that the speakers 160 can be moved in one or more directions by a user to position the speakers 160 accordingly, similar to as described above for other parts of the reference image holder 100.

In some implementations, the speakers 160 may be adjustably or repositionably attached to the base 110 such that the position at which the speakers 160 are attached to the base 110 can be adjusted or otherwise changed.

In some implementations, the speakers 160 may be removably attached to the base 110 such that the speakers 160 can be removed and reattached to the base 110.

In some implementations, the speakers 160 may be attached to the base 110 or other part of the reference image holder 100 in any suitable way. In some implementations, the speakers 160 may be attached to the base 110 or other part of the reference image holder 100 in any suitable configuration.

In some implementations, the speakers 160 may be attached to any other suitable component of the reference image holder 100 in a same or similar way as described with respect to the base 110. For example, in some implementations, the speakers 160 may alternately or additionally be attached to the pole 120, the first arm 130, and/or the second arm 140.

In some implementations, the speakers 160 are configured to be attached (or otherwise connected or integrated) to the reference image holder 100, such as described above.

In some implementations, the speakers 160 are configured to provide an audio output, such as music, dialogue, etc., such as while using the reference image holder 100.

In some implementations, the speakers 160 are configured to be wireless. For example, in some implementations, the speakers 160 may be wirelessly connected to audio source by Bluetooth or Wireless Fidelity (Wi-Fi) signal technology.

In some implementations, the speakers 160 may be alternately or additionally be configured to be wired. In some implementations, the speakers 160 may be configured to connect to an audio source in any other suitable way.

In some implementations, the speakers 160 may be configured to be turned on and off.

In some implementations, the speakers 160 may be configured to be adjusted. For example, in some implementations, the output volume or other suitable audio output quality of the speakers 160 may be adjustable.

In some implementations, the speakers 160 may be configured to be powered by a portable power source. For example, in some implementations, the speakers 160 may be configured to be powered by a rechargeable or replaceable battery power source.

In some implementations, the speakers 160 may be configured to be powered by a solar powered source. In some implementations, the speakers 160 may be configured to be powered by any other suitable power source.

In some implementations, such power source for the speakers 160 may be integrated to the speakers 160. In some implementations, such power source for the speakers 160 may be attached or otherwise integrated to the reference image holder 100.

In some implementations, the speakers 160 may also or alternately be configured to be powered by a wired (e.g., wall socket plug-in) power source.

In some implementations, the speakers 160 may be configured to be moveable by a user in one or more directions, as described above, to adjust the positioning of the speakers 160, such as to direct the audio output from the speakers 160.

In some implementations, the speakers 160 may be configured to be moveable in any other suitable way.

In some implementations, the speakers 160 may be configured to provide any other suitable features of the reference image holder 100.

In some implementations, one or more of the above described components of the reference image holder 100 may be integrated together as a single or continuous component. For example, in some implementations, the pole 120 and the first arm 130 may be integrated together to have the combined features described above for each component.

In some implementations, the first arm 130 and the second arm 140 may be integrated together to have the combined features described above for each component. In some implementations, the pole 120, the first arm 130, and the second arm 140 may be integrated together to have the combined features described above for each component.

In some implementations, the second arm 140 and the attachment mechanism 142 may be integrated together to have the combined features described above for each component. In some implementations, the base 110 and the wheels 112 may be integrated together to have the combined features described above for each component.

In some implementations, any other suitable combination, permutation, etc. of the components of the reference image holder 100 may be integrated together to have the combined features described above for each component, which will be understood by one skilled in the art in accordance with the present disclosure.

In some implementations, the reference image holder 100 is configured to allow an artist to conveniently hold and move around a reference image 10 while making a painting 20 or other artwork. For example, in some implementations, the reference image holder 100 is configured to allow an artist to hold a reference image 10 hands-free and without having to prop the reference image 10 against an object 30, such as described above for FIGS. 1A and 1B.

In some implementations, the reference image holder 100 is configured to allow an artist to move around the reference image 10 to various viewing positions, locations, orientations, etc., such as by the base 110, wheels 112, pole 120, first arm 130, and/or second arm 140 described above for FIG. 2.

In some implementations, the reference image holder 100 is configured to hold a reference image 10, such as by the second arm 140 and/or the attachment mechanism 142 described above for FIG. 2.

In some implementations, the reference image holder 100 is configured to move a reference image 10, such as by the base 110, wheels 112, pole 120, first arm 130, and/or second arm 140 described above for FIG. 2.

In some implementations, the reference image holder 100 is configured to illuminate a reference image 10, such as by the light source 150 described above for FIG. 2.

In some implementations, the reference image holder 100 is configured to hold a reference image 10 in place for an artist to use for making a painting 20 or other artwork.

In some implementations, the reference image holder 100 is configured to move a reference image 10 to a desired location and/or position for viewing by an artist while making a painting 20 or other artwork.

In some implementations, the reference image holder 100 is configured to be portable.

In some implementations, the reference image holder 100 is configured to be positioned on a surface, such as a floor or a tabletop.

In some implementations, the reference image holder 100 may be configured such that reference image holder 100 can be used various users who may use a reference image 10. For example, in some implementations, the reference image holder 100 may be configured to be used by painters, sculptors, and/or architects. In some implementations, the reference image holder 100 may be configured to be used by other visual artists and/or tattoo artists.

In some implementations, the reference image holder 100 comprises any suitable dimensions. For example, in some implementations, the reference image holder 100 is sized to allow a user to use the reference image holder 100 to hold a reference image 10 with the reference image holder 100 positioned on a floor, tabletop, or other surface.

In some implementations, the reference image holder 100 is composed of any suitable materials. For example, in some implementations, the reference image holder 100 may be composed of steel or metal. In some implementations, some parts of the reference image holder 100 may be composed of plastic, such as the base 110 and/or the wheels 112.

In some implementations, the reference image holder 100 can have any suitable appearance. For example, in some implementations, the reference image holder 100 may be one or more different colors.

In some implementations, an example method of using the reference image holder 100, with respect to the above-described FIGs., comprises positioning the reference image holder 100 on a surface, such as a tabletop or floor. In some implementations, the reference image holder 100 is positioned on (and supported upon) the surface by the base 110 and/or the wheels 112.

In some implementations, the method comprises attaching a reference image 10 to the reference image holder 100. In some implementations, the reference image 10 is attached to hold the reference image 10 for a user, such as an artist, to use to make a painting 20 or other artwork. In some implementations, the reference image 10 is attached to the second arm 140 of the reference image holder 100 by the attachment mechanism 142.

In some implementations, the reference image may be a photograph, a drawing, a painting, or other visual object that the user can view, study, or otherwise utilize for making a painting 20 or other artwork.

In some implementations, the method further comprises using the reference image 10 while attached and held by the reference image holder 100. For example, in some implementations, a user, such as an artist, views, studies, or otherwise uses the reference image 10 to make a painting 20 or other artwork.

In some implementations, the method may further comprise positioning the reference image 10 by the reference image holder 100. In some implementations, the reference image 10 is positioned by moving the reference image holder 100 to one or more positions on a surface, such as a floor or tabletop.

In some implementations, the reference image 10 is positioned by adjusting or otherwise moving the position of the reference image 10 by the reference image holder 100. For example, in some implementations, the height or vertical positioning of the reference image 10 is adjusted. In some implementations, the horizontal positioning of the reference image 10 is adjusted.

In some implementations, the orientation, such as the tilt or viewing angle, of the reference image 10 is adjusted. In some implementations, any other suitable positioning of the reference image 10 is adjusted.

In some implementations, the position of the reference image 10 is positioned/moved to allow the user to better view or otherwise utilize the reference image 10 while held by the reference image holder 100.

In some implementations, the reference image holder 100 is moved to position the reference image 10 by using the base 110 and/or wheels 120 of the reference image holder 100. In some implementations, the position of the reference image 10 is positioned/moved by moving or otherwise adjusting the pole 120, the first arm 130, and/or the second 140 of the reference image holder 100.

In some implementations, the method may further comprise illuminating (lighting) the reference image 10 by the reference image holder 100. In some implementations, the reference image 10 is illuminated to allow the user to better view or otherwise utilize the reference image 10 while held by the reference image holder 100.

In some implementations, the reference image 10 is illuminated by the light source 150 of the reference image holder 100. In some implementations, the light source 150 positioned/moved to illuminate the reference image 10, such as described above to position/move other components 120, 130, 140 of the reference image holder 100.

In some implementations, the method may further comprise using the speakers 160 of the reference image holder 100 to output audio such as music or dialogue. In some implementations, the speakers 160 may be used to audibly provide information and/or entertainment by such audio output from the speakers 160.

In some implementations, the speakers 160 may be used while the reference image holder 100 is used to hold a reference image 10.

As another non-limiting implementation or embodiment and as shown in FIGS. 3-7, the reference image holder 200 may include or comprise some or all of the following components: a base 210, a pole 220, a gooseneck section 230, at least one height adjuster collet 240, a handle 250, magnet strips 260, an interchangeable reference bar 270, music control(s) 280, an LED and power button 290, and USB port or connector 295.

The pole 220 includes a first end 222, a second end 224, and a body 226, and extends upwardly from the base 210.

The gooseneck section 230 is preferably flexible to bend and/or swivel to different positions and is preferably a rubber gooseneck section.

The handle 250 holds images, subject, or composition for the visual artist or tattoo artist, and preferably includes LED light(s) built in. The LED light(s) provides extra illumination in or for the room.

The magnet strips 260 snap or are secured to the interchangeable reference bar 270.

The music control(s) or control system 280 helps to provide music through speaker(s) and speaker holes 285. As a non-limiting example, a Bluetooth speaker may be included to provide music, such as. but not limited to, inspirational music.

The LED and power button 290 can be activated or deactivated by a user to turn the LED light(s) on or off.

The USB port or connector 295 is adapted for receiving an end of a cell phone charging cable and the like, and is also adapted for providing power to a cell phone or another electronic device.

The figures, including photographs and drawings, comprised herewith may represent one or more implementations of the reference image holder.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

It is to be understood that the present invention is not limited to the embodiments described above or as shown in the attached figures, but encompasses any and all embodiments within the spirit of the invention.

The invention claimed is:

1. A reference image holder comprising:
   a first end;
   a second end;
   a base located about said first end of said reference image holder;
   a pole extending upwardly from said base and said first end of said reference image holder toward said second end of said reference image holder,
   wherein said pole comprises a first end, a second end, and a body extending between said first end and said second end of said pole;
   a flexible, gooseneck section capable of being bent and/or being swiveled to a plurality of alternative positions such that said reference image holder may be positioned in a plurality of alternative use positions;
   at least one height adjuster for allowing said reference image holder to be adjustable to different heights;
   an interchangeable reference bar; and
   a holder dimensioned and configured for engaging with said interchangeable reference bar and for securing a reference image in place to such that a user is able to view the reference image from a distance and to draw on a drawing source while not needing to hold or make contact with the reference image,
   wherein said holder is at least one magnetic item.

2. The reference image holder according to claim 1, wherein said flexible, gooseneck section is located about said second end of said reference image holder.

3. The reference image holder according to claim 1, wherein said flexible, gooseneck section is made of a rubber material.

4. The reference image holder according to claim 1, wherein said holder is a plurality of magnet strips.

5. The reference image holder according to claim 1, further comprising at least one additional item selected from the group consisting of at least one LED light and a power button.

6. The reference image holder according to claim 1, further comprising at least one item selected from the group consisting of at least one music control, and at least one USB port or connector.

7. The reference image holder according to claim 1, further comprising at least one additional item selected from the group consisting of at least one LED light, a power button, at least one music control, and at least one USB port or connector, wherein said holder is a plurality of magnet strips.

8. A reference image holder comprising:
   a first end;
   a second end;
   a base located about said first end of said reference image holder;
   a pole extending upwardly from said base and said first end of said reference image holder toward said second end of said reference image holder,
   wherein said pole comprises a first end, a second end, and a body extending between said first end and said second end of said pole;
   a flexible, gooseneck section capable of being bent and/or being swiveled to a plurality of alternative positions such that said reference image holder may be positioned in a plurality of alternative use positions;
   a holder dimensioned and configured for securing a reference image in place such that a user is able to view the reference image from a distance and to draw on a drawing source while not needing to hold or make contact with the reference image, and wherein said holder is at least one magnetic item; and at least one additional item: om the group consisting of at least one LED light, a power button, at least one music control, and at least one USB port or connector.

9. The reference image holder according to claim 8, wherein said flexible, gooseneck section is located about said second end of said reference image holder.

10. The reference image holder according to claim 8, wherein said flexible, gooseneck section is made of a rubber material.

11. The reference image holder according to claim 8, wherein said at least one additional item is said at least one LED light and said power button.

12. The reference image holder according to claim 8, wherein said at least one additional item is said at least one music control and said at least one USB port or connector.

13. The reference image holder according to claim 8, wherein said at least one additional item is said at least one LED light, said power button, said at least one music control, and s id at least one USB port or connector, wherein said holder is a plurality of magnet strips.

14. A reference image holder comprising:

a first end;

a second end;

a base located about said first end of said reference image holder;

a pole extending upwardly from said base and said first end of said reference image holder toward said second end of said reference image holder, wherein said pole comprises a first end, a second end, and a body extending between said first end and said second end of said pole;

at least one height adjuster for allowing said reference image holder to be adjustable to different heights; and a holder dimensioned and configured for securing a reference image in place such that a user is able to view the reference image from a distance and to draw on a drawing source while not needing to hold or make contact with the reference image, and wherein said holder is at least one magnetic item.

15. The reference image holder according to claim 14, wherein said at least one height adjuster is a collet.

16. The reference image holder according to claim 14, wherein said holder is a plurality of magnet strips.

17. The reference image holder according to claim 14, further comprising at least one additional item selected from the group consisting of at least one LED light and a power button.

18. The reference image holder according to claim 14, further comprising at least one music control.

19. The reference image holder according to claim 14, further comprising at least one USB port or connector.

20. The reference image holder according to claim 14, further comprising at least one additional item selected from the group consisting of at least one LED light, a power button, at least one music control, and at least one USB port or connector, wherein said holder is a plurality of magnet strips.

* * * * *